United States Patent

Notagashira et al.

Patent Number: 5,216,549
Date of Patent: Jun. 1, 1993

[54] LENS BARREL

[75] Inventors: Hidefumi Notagashira; Toshimi Iizuka, both of Yokohama, Japan

[73] Assignee: Canon Kabushiki Kaisha, Tokyo, Japan

[21] Appl. No.: 748,254

[22] Filed: Aug. 21, 1991

[30] Foreign Application Priority Data

Aug. 23, 1990 [JP] Japan .................. 2-222087
Sep. 18, 1990 [JP] Japan .................. 2-248310

[51] Int. Cl.⁵ .............................. G02B 7/10
[52] U.S. Cl. ...................... 359/703; 359/699
[58] Field of Search ......... 359/699, 700, 701, 702, 359/703, 822, 823

[56] References Cited

U.S. PATENT DOCUMENTS

| | | | |
|---|---|---|---|
| 4,707,083 | 11/1987 | Iizuka et al. | 359/700 |
| 4,759,618 | 7/1988 | Kamata | 359/703 |
| 4,834,514 | 5/1989 | Atsuta et al. | 359/703 |
| 5,037,187 | 8/1991 | Oda et al. | 359/699 |

FOREIGN PATENT DOCUMENTS

0133014 5/1989 Japan ................ 359/699

*Primary Examiner*—Carolyn E. Fields
*Assistant Examiner*—Drew A. Dunn
*Attorney, Agent, or Firm*—Robin, Blecker, Daley & Driscoll

[57] ABSTRACT

A lens barrel comprises a lens, a lens holding member holding the lens and movably supported, and cam arrangement for moving the lens holding member. The cam arrangement has a cam portion projectedly formed on a movable cam member, and a cam follower contacting with the cam portion. The cam follower has a plurality of contact surfaces for sandwiching the cam portion therebetween by surface contact. The plurality of contact surfaces are disposed while being deviated along the direction of extension of the cam portion.

23 Claims, 7 Drawing Sheets

LENS BARREL

BACKGROUND OF THE INVENTION

1. Field of the Invention

This invention relates to a lens barrel having driving device for driving a lens.

2. Related Background Art

In many photographing systems, a driving device capable of effecting highly accurate movement free of back-lash has heretofore been demanded for an apparatus for performing the operation of rotating or rectilinearly moving a lens holding cylinder when the zooming operation or the focusing operation is performed.

For example, U.S. Pat. No. 4,386,829 proposes a moving device for a lens holding cylinder which uses appropriately constructed cam means to make highly accurate movement possible.

In this patent, a cam portion is provided in a portion of the lens holding cylinder movable by the rotating operation such as the zooming operation or the focusing operation. This cam portion is provided with two cam surfaces, and a rectilinear movement groove intersecting these cam surfaces is formed in a fixed cylinder, a key member is fitted into this rectilinear movement groove, a pillar-like cam follower which is in contact with one of the cam surfaces of the cam portion is secured to the key member, a groove is formed in the key member, and a pillar-like projected piece which is in contact with the other cam surface of the cam portion is engaged with the groove. The cam follower and the projected piece are tensioned by a spring extended in the groove of the key member, and the cam follower and the projected piece are biased against the cam surfaces of the cam portion, thereby providing a moving device for a lens holding cylinder in which the creation of back-lash is prevented.

In the moving device for the lens holding cylinder proposed in the aforementioned U.S. Pat. No. 4,386,829, when for example a strong shock force is applied to the lens holding cylinder, the cam surfaces of the cam portion may be flawed or scarred by the cam follower. If the cam surfaces are flawed or scarred, back-lash will be created in the lens holding cylinder, for example, by zooming, to thereby deteriorate the optical performance remarkably.

Against this, the assignee hereof has proposed in U.S. Pat. No. 4,465,344 a moving device for a lens holding cylinder in which the radius of the portion of a cam follower which is in contact with a cam surface is made great to thereby prevent the cam surface or the protective wall surface from being flawed when a shock force is applied to the lens holding cylinder.

Members constituting a lens barrel structure, for example, a lens fixing cylinder and a cam cylinder having a cam for regulating a lens unit for movement, have heretofore been molded and manufactured by the use of a plastic material. There have been proposed various lens driving devices in which the cam cylinder provided by such a method is rotated or rectilinearly moved to change the position thereof on the optic axis, thereby accomplishing focusing or magnification change.

U.S. Pat. No. 4,707,083 proposes a lens moving device in which a guide pin bears against the side of one of cam slots formed in a fixed cylinder and a cam cylinder and having a predetermined angle of inclination and the guide pin is biased by spring means and the guide pin engaged at the point of intersection between the two cam slots is utilized to move a movable lens frame in the direction of the optic axis and accomplish magnification change.

In the lens moving device according to the prior art, cam slots are formed in both of the fixed cylinder and the cam cylinder and a cam follower engaged at the point of intersection between the two cam slots is utilized to move the lens frame.

Therefore, the space of the cam slots becomes wide in a lens barrel for a lens frame which is great in the amount of movement, and this has led to the problem that the cam cylinder becomes weak in terms of strength and the outer peripheral surface of the lens barrel cannot be used intact as an exterior part.

As a countermeasure for these problems, there has also been proposed a cam cylinder in which a wall is left on the outer peripheral surface of a cam slot, but this method has suffered from the problem of adopting such complicated mold structure that a mold must be slidably moved toward the inner peripheral surface side or must be parted while being rotated when the cam cylinder is molded by the use of a plastic material.

Also, in the lens moving device of the aforementioned U.S. Pat. No. 4,386,829, a convex cam is formed in a curved shape and therefore, one of cam followers becomes displaceable by a spring, and this has led to the tendency that assembly and adjustment become difficult.

SUMMARY OF THE INVENTION

One aspect of this invention is that cam means is used to move a lens holding cylinder and the cam means has a cam portion protruding in the direction of inner diameter of the lens holding cylinder and a cam follower embracing the cam portion by surface contact and the surface of the cam follower which embraces said cam portion is formed with a deviation, whereby the cam portion is made strong against shock or abrasion and smooth and highly accurate movement is made possible.

One aspect of this invention is that a cam follower is positioned at the point of intersection between a cam slot formed in a fixed member and a lead cam formed on a cam member and a lead groove embracing the lead cam is formed in a portion of the cam follower and the peripheral portion thereof is formed so as to be insertable into the cam slot, whereby the mold structure when the cam member is molded by the use of a plastic material can be made simple and moreover strong against shock or abrasion.

DESCRIPTION OF THE PREFERRED EMBODIMENTS

Figure 1:
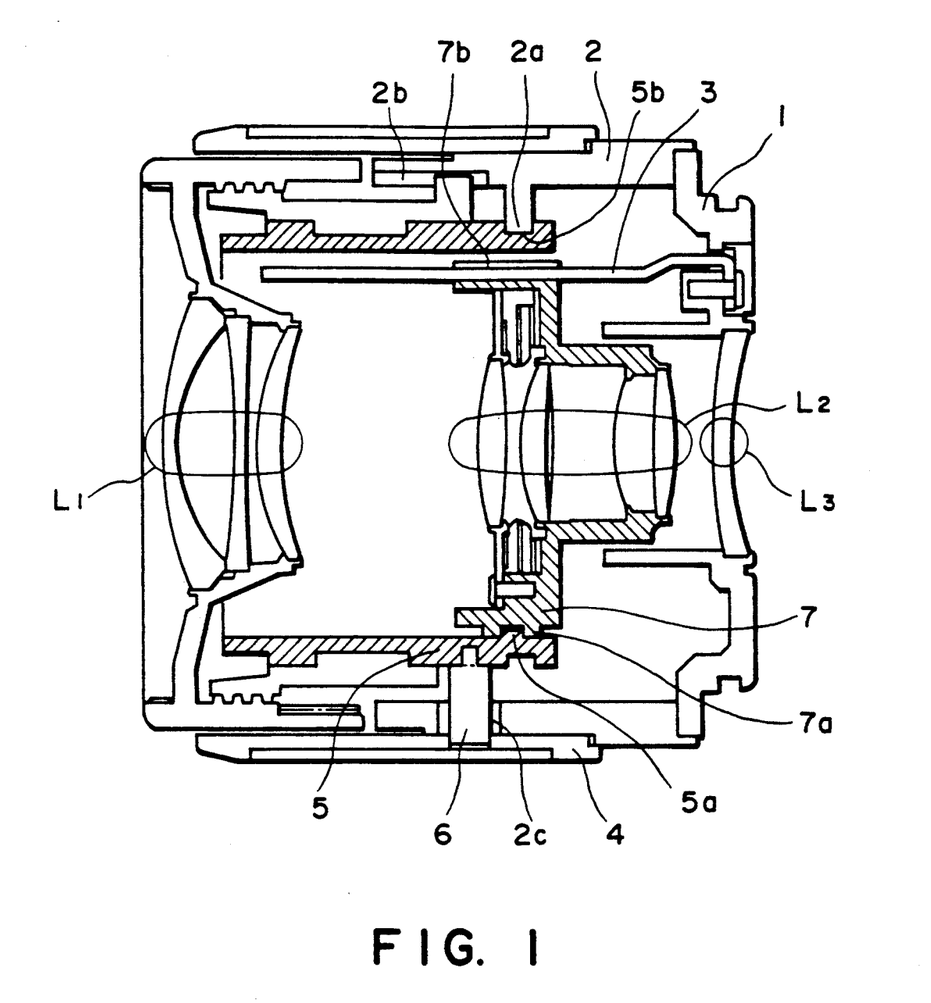
FIG. 1 is a schematic cross-sectional view of the essential portions of a first embodiment of the present invention as it is applied to a zoom lens.
Figure 2:
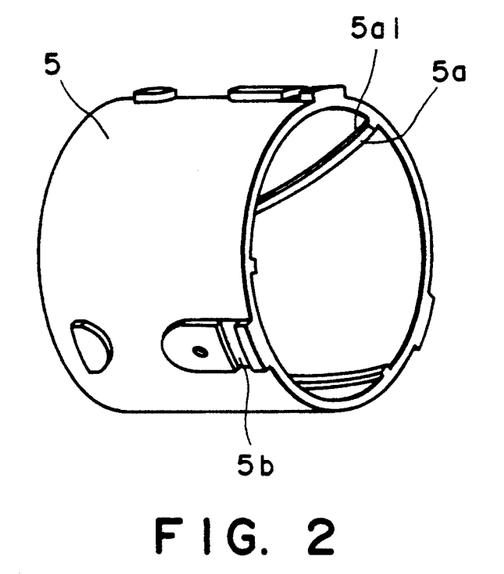
FIG. 2 is a perspective view of the essential portions of the cam cylinder of FIG. 1.
Figure 3:
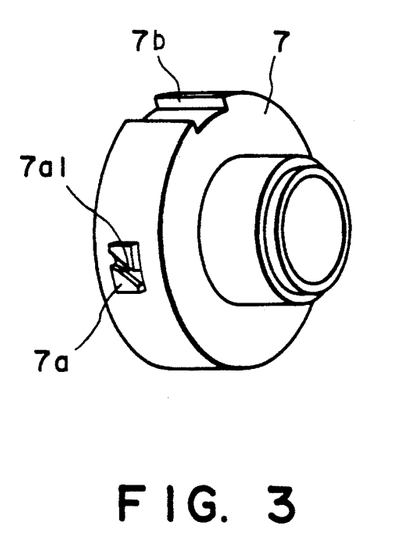
FIG. 3 is a perspective view of the essential portions of the lens barrel of FIG. 1.
Figure 4:
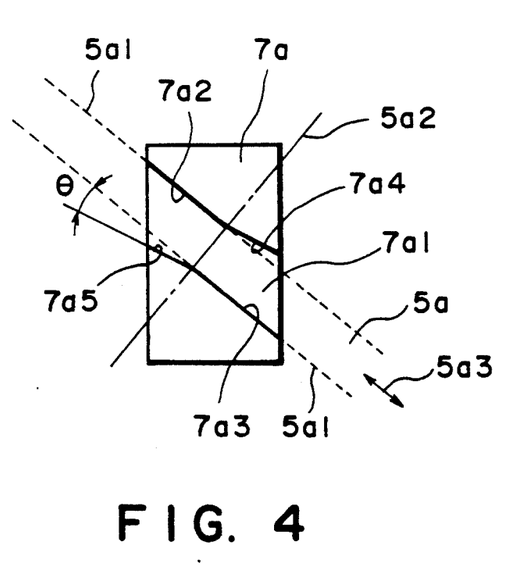
FIG. 4 is an enlarged schematic view of a cam follower constituting a portion of FIG. 3.

FIG. 1 is a schematic cross-sectional view of the essential portions of a first embodiment of the present invention as it is applied to a zoom lens, FIG. 2 is a perspective view of the essential portions of the cam cylinder of FIG. 1, FIG. 3 is a perspective view of the essential portions of the lens barrel of FIG. 1, and FIG. 4 is an enlarged schematic view of a portion of FIG. 3.

In these figures, the reference numeral 1 designates a lens mount portion which performs the function of mounting and dismounting with respect to a camera body (not shown). The reference numeral 2 denotes a fixed cylinder provided in portions thereof with a bayonet pawl 2a, a key way 2b in which a key member parallel to the optic axis is fitted, and an escape hole 2c in which a pin 6 provided along the circumferential direction is fitted. The reference numeral 3 designates a key member secured to the lens mount portion 1 and extending out in the direction of the optic axis. The reference numeral 4 denotes a zooming operation ring supported for rotation relative to the fixed cylinder 2 and having the pin 6 studded on a portion thereof. The reference numeral 5 designates a cam cylinder formed of a plastic material and held for rotation within a predetermined angle range by the bayonet pawl 2a inside the fixed cylinder 2. A lens holding cylinder 7 movable in the direction of the optic axis is loosely inserted in the cam cylinder 5 through cam means which will be described later.

The reference character 5a denotes cam portions of square cross-sectional shape protruding toward the center of the bore surface of the cam cylinder 5 and provided so as to have a predetermined lead. The reference character 5b designates a groove portion which is formed in the outer peripheral portion of the cam cylinder 5 and in which the bayonet pawl 2a provided on the fixed cylinder 2 is fitted. The aforementioned pin 6 connects the cam cylinder 5 and the zooming operation ring 4 together through the escape hole 2c in the fixed cylinder 2, and transmits the rotational force of the zooming operation ring 4 to the cam cylinder 5.

The reference numeral 7 denotes a lens holding cylinder movable in the direction of the optic axis. The reference character 7a designates a cam follower provided integrally with the outer peripheral portion of the lens holding cylinder 7. The cam portion 5a and the cam follower 7a together constitute an element of a cam means. The reference 7b denotes a key way which is formed in the outer peripheral portion of the lens holding cylinder 7 in a direction parallel to the optic axis and in which the key member 3 extending from the mount 1 is fitted. L1, L2 and L3 designate lens units constituting a zoom lens and held by the lens holding cylinder.

In the present embodiment, the zooming operation ring 4 is rotated in such a construction. Thereupon, the cam cylinder 5 connected to the zooming operation ring 4 by the pin 6 studded thereon is rotated about the optic axis. The lens holding cylinder 7 is held inside the cam cylinder 5, the cam follower 7a embraces the three cam portions 5a, and the key member 3 is fitted in the key way 7b. Therefore, when the cam cylinder 5 is rotated, the lens holding cylinder 7 is guided by the key member 3 in conformity with the amount of rotation of the cam cylinder 5 and is moved by a predetermined amount in the direction of the optic axis.

At this time, the cam portions 5a of the cam cylinder 5 are in engagement with the cam follower 7a of the lens holding cylinder 7, and the lens holding cylinder 7 is moved in the direction of the optic axis with a predetermined lead. Thereby, the zooming operation is accomplished.

In the present embodiment, the cross-sectional shape of each cam portion 5a is square, and a cam surface 5a1 which is the side thereof is designed to make surface-contact with the sides 7a2 and 7a3 of the groove portion 7a1 of the cam follower 7a, as shown in FIG. 4.

In this manner, the cam follower 7a embraces the cam surface 5a1 by surface contact. Also, among the sides of the cam follower 7a, the surfaces 7a4 and 7a5 opposed to each other with the cam portions 5a interposed therebetween and opposite to a line 5a2 orthogonal to the direction of movement 5a3 of the cam portion 5a are constituted by such inclined surfaces (planar or curved surfaces) that have a predetermined angle $\theta$ in a direction away from the can portions 5a.

Smooth zooming operation is made possible by such a construction and also, the cam surface is effectively prevented from being damaged by the shock force of the lens holding cylinder 7.

Figure 5:
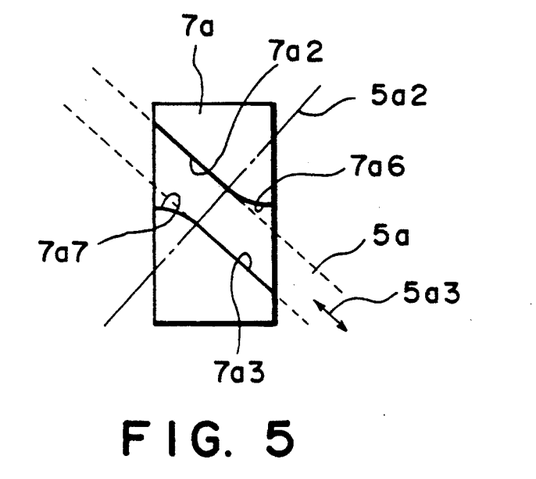
FIGS. 5 and 6 are enlarged schematic views of second and third embodiments, respectively, of the cam follower according to the present invention.
Figure 6:
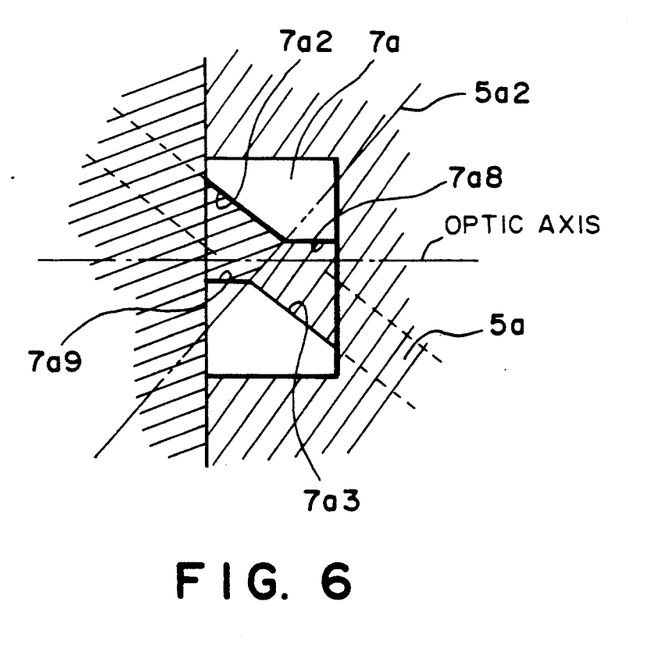

FIGS. 5 and 6 are schematic views of the essential portions of second and third embodiments, respectively, of the cam follower according to the present invention.

In the second embodiment of FIG. 5, among the sides of the cam follower 7a, surfaces 7a6 and 7a7 corresponding to the two surfaces 7a4 and 7a5 shown in FIG. 4 are constituted by curved surfaces. In the other points, the cam follower of the present embodiment is the same as the cam follower of FIG. 4.

In the third embodiment of FIG. 6, among the sides of the cam follower 7a, surfaces 7a8 and 7a9 corresponding to the two surfaces 7a4 and 7a5 shown in FIG. 4 are increased in the angle $\theta$ and constructed so as to be parallel to the optic axis. Thereby, when the cam follower 7a is to be molded by the use of plastic as indicated, for example, by hatching in FIG. 6, surfaces 7a2 and 7a3 for contact with the cam surface of the cam follower 7a can be molded by a movable mold openable in the direction of the optic axis and a fixed mold.

While the above embodiments have been described with respect to a case where the present invention is applied to a lens barrel moved by the zooming operation, the present invention is equally applicable to a lens barrel moved by the focusing operation.

According to the first to third embodiments described above, the cam portion and cam follower as cam means for moving the lens holding cylinder are designed to make surface contact as previously described, whereby there can be achieved a moving device for the lens holding cylinder in which the can surface is not damaged even by a strong shock applied to the cam follower and which is strong against the abrasion of the cam follower as well as capable of effecting smooth and highly accurate movement.

Also, in the prior art, the cross-sectional shape of the cam portions has been trapezoidal and therefore, the variation in the width of the cam portions caused by the deformation of the cam cylinder has been great and it has been difficult to maintain the accuracy of the cam portions, and it has been difficult to measure the lift dimensions of the cam surfaces of the whole mold for molding the cam surface and the molded article.

In contrast, according to the above-described embodiments, the cross-sectional shape of the cam portions is made square, whereby molding into a complete square screw shape becomes possible and therefore, for example, the measurement of the dimensions of the cam surfaces of the whole mold for molding and the molded article is easy and a highly accurate shape is ensured. Also, the influence of the deformation of the cam cylinder upon the width of the projections of the cam portions is small and the wedge action is absent as compared with cam portions of trapezoidal shape, and this leads to the characteristic that the operation of the cam cylinder can be accomplished with a low torque.

Where the cam follower is to be molded integrally with the lens holding cylinder, molding is effected by a slide mold usually parting in a direction perpendicular to the optic axis, but in the case of completely square-shaped cam portions, the torsion by the lead of the cam portions will form an undercut portion relative to the direction of parting of the mold and parting will become impossible. In contrast, according to the present invention, the portion in which said torsion occurs is set free from the cam portions at a predetermined angle, whereby molding becomes possible.

Also, by the cam follower being formed like the embodiment shown in FIG. 6, the lens holding cylinder can be molded by a mold structure which does not require a slide mold, i.e., a movable mold openable in the direction of the optic axis and a fixed mold, and this is greatly meritorious in terms of mold structure and cost.

A fourth embodiment will now be described.

Figure 7:
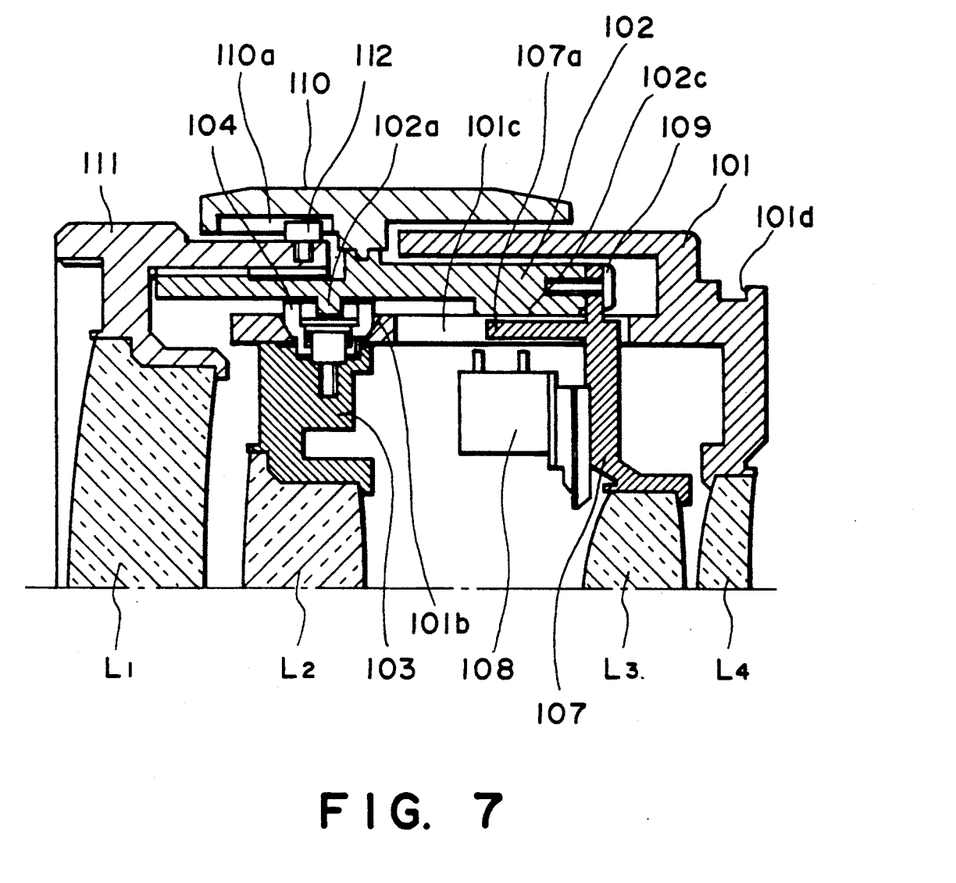
FIG. 7 is a cross-sectional view of the essential portions of a fourth embodiment of the present invention.
Figure 8:
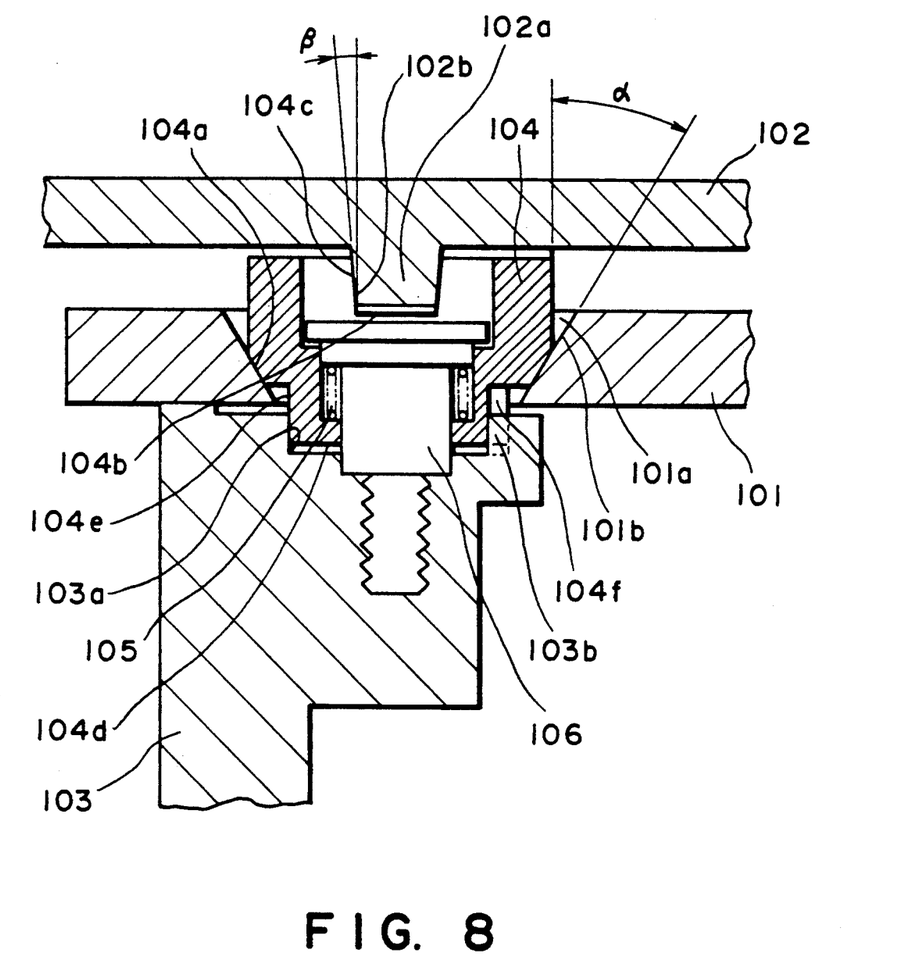
FIG. 8 is an enlarged illustration of the vicinity of the cam follower of FIG. 7.
Figure 9:
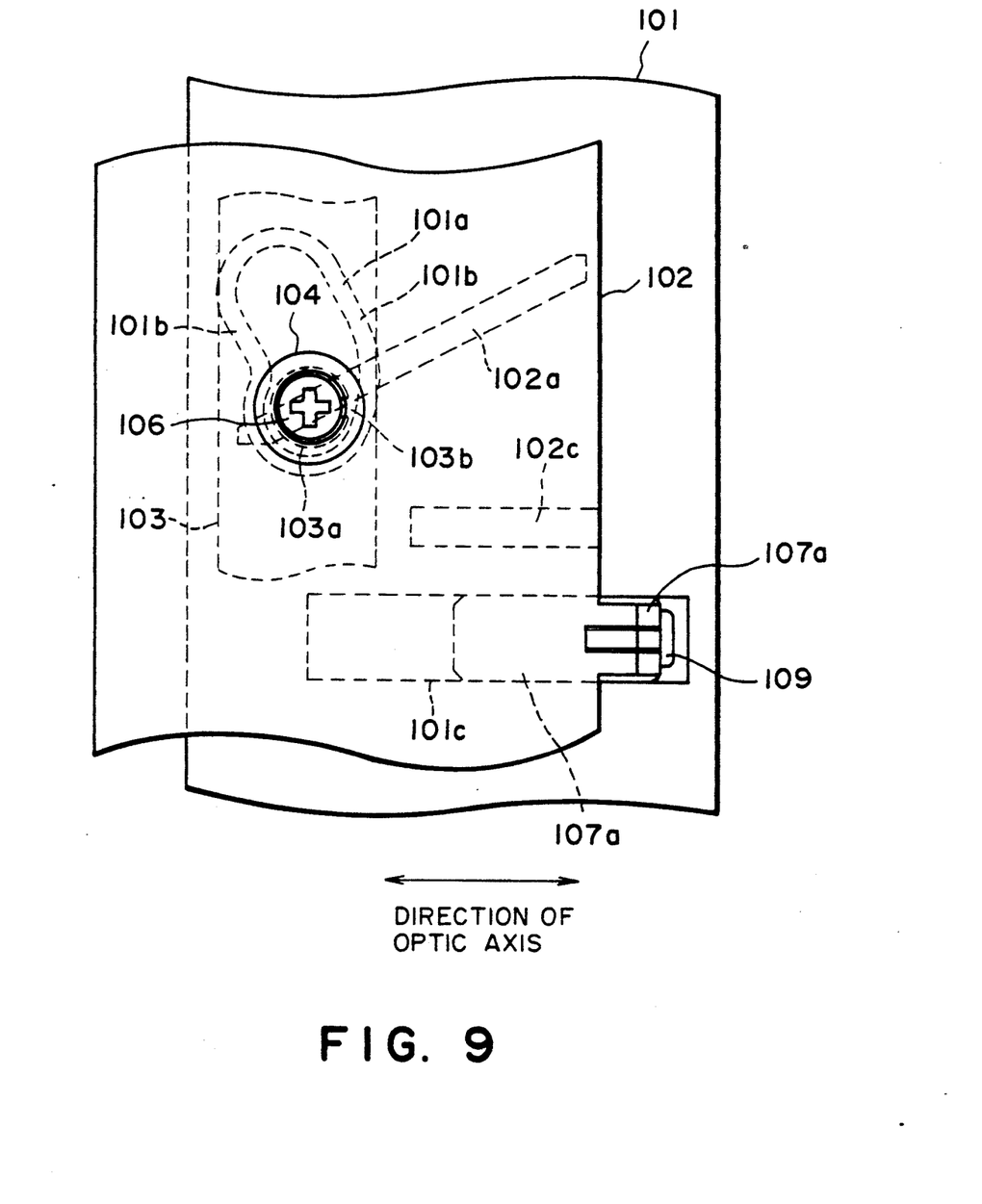
FIG. 9 is a developed view of the essential portions on the outer peripheral surface of the cam follower of FIG. 7.
Figure 10:
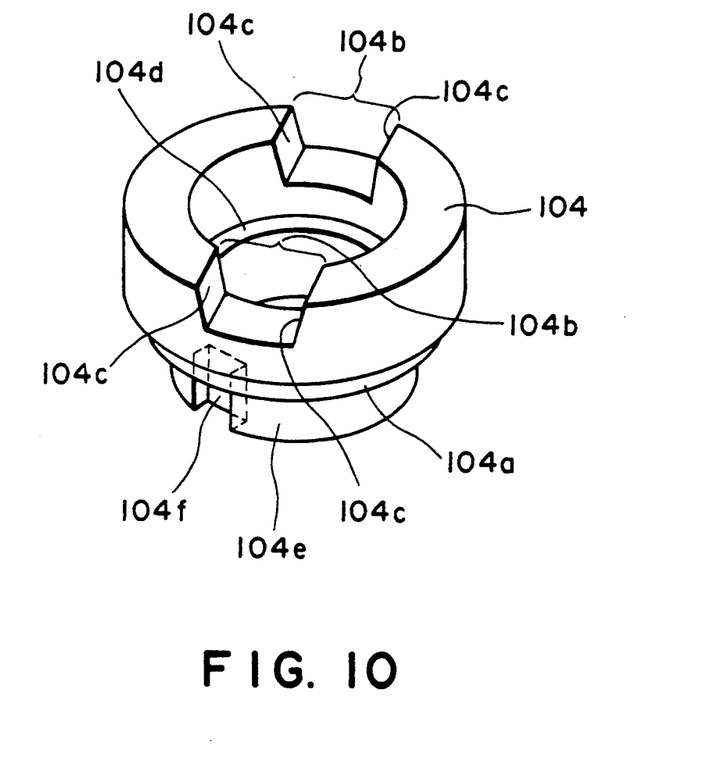
FIG. 10 is a perspective view of the essential portions of the cam follower of FIG. 7.

FIG. 7 is a cross-sectional view of the essential portions in the upper half of a lens moving device according to the fourth embodiment, FIG. 8 is an enlarged view of the essential portions of FIG. 7, FIG. 9 is a developed view of the essential portions on the outer peripheral surface of the cam follower of FIG. 7, and FIG. 10 is a perspective view of the essential portions of the cam follower of FIG. 7.

In these figures, L1, L2, L3 and L3 designate lens units constituting a photo-taking lens and each comprising one or more lenses.

The reference numeral 101 denotes a fixed cylinder which holds the lens unit L4. In the circumference of the fixed cylinder 101, there are formed a cam slot 101a having an inclined surface 101b of an angle $\alpha$ with respect to a plane perpendicular to the optic axis and a key way 101c parallel to the optic axis. In the end portion of the fixed cylinder 101, there is provided a mount portion 101d which is a portion coupled to a camera body (not shown).

The reference numeral 102 designates a cam cylinder fitted in the fixed cylinder 101. On the inner peripheral surface of the cam cylinder 102, there are provided a convex lead cam 102a having a lead having an inclined surface 102b of an angle $\beta$ with respect to a plane perpendicular to the optic axis and a sliding portion 102c. The convex lead cam 102a and the sliding portion 102c are disposed on the cam cylinder 102 so as not to overlap with each other in the direction of the optic axis as shown in FIG. 9. The cam cylinder 102 is fitted so that the sliding portion 102c may fit over the outer peripheral surface of the fixed cylinder 101.

The reference numeral 103 denotes a first movable lens frame. A hole 103a is formed in the outer peripheral portion of the first movable lens frame 103, and a projected portion 103b is provided on the inner wall of the first movable lens frame 103. The first movable lens frame 103 holds the lens unit L2 for magnification change, and is fitted to the inner peripheral surface of the fixed cylinder 101.

The reference numeral 104 designates a cam follower which is of such a shape as shown in FIG. 10. The surface 104a of the cam follower 104 which bears against the inclined surface 101b of an angle $\alpha$ of the cam slot 101a in the cam cylinder 101 comprises an inclined surface 104a having an angle similar to the angle $\alpha$. In a portion of the upper surface of the cam follower 104, there is formed a lead groove 104b having an inclined surface 104c having an angle $\beta$ similar to the angle $\beta$ which bears against the convex lead cam 102a of the cam cylinder 102.

Also, the cam follower 104 is provided with an outer peripheral fitting portion 104e having a concave portion 104f in a portion of the periphery thereof. The inner peripheral side of the cam follower 104 provides a hollow hole 104d. The cam follower 104 is set so that the projected portion 103b provided in the hole 103a of the first movable lens frame 103 may fit in the concave portion 104f provided in the outer peripheral fitting portion 104e of the cam follower.

The cam follower 104 is biased by a coil spring 105 so that the inclined surface 104a of the cam follower 104 may bear against the inclined surface 101b of the cam slot 101a. One end of the coil spring 105 is received by a screw secured to the first movable lens frame 103. The upper lead groove 104b of the cam follower 104 is designed so as to embrace the convex lead cam 102a of the cam cylinder 102 and be slidable.

The reference numeral 107 denotes a second movable lens frame having a key portion 107a. The second movable lens frame 107 holds the lens unit L3 for magnification change and an aperture unit 108, and the key portion 107a thereof is engaged with the key way 101c of the fixed cylinder 101 without back-lash, and is integrally secured to the cam cylinder 102 by a screw 109. The reference numeral 110 designates an operating ring mounted for rotation relative to the cam cylinder 102 and coupled for movement with the latter in the direction of the optic axis. In the inner peripheral surface of the operating ring 110, there is formed a key way 110a parallel to the optic axis. The reference numeral 111 denotes a forward group lens frame which holds the lens unit L1 for focusing and which is helicoid-coupled by the outer peripheral surface of the fore portion of the cam cylinder 102. The reference numeral 112 designates a key screw studded on the outer peripheral surface of the forward group lens frame 111 and inserted in the key way 110a of the operating ring 110 without back-lash.

The operation of the present embodiment will now be described.

As the operating ring 110 is first rotated, the forward group lens frame 111 is also rotated and moves in the direction of the optic axis while being rotated by the helicoid coupling thereof to the cam cylinder 102 through the key screw 112, whereby the focusing operation is performed.

When the operating ring 110 is then moved rectilinearly in the direction of the optic axis, the cam cylinder 102 has its rotation restricted by the coupled relationship between the key way 101c of the fixed cylinder 101 and the key portion 107a of the second movable lens frame 107 and moves in the direction of the optic axis by an amount equal to the amount of movement of the operating ring 110. At this time, the forward group lens frame 111 moves by an amount equal to the amount of movement of the cam cylinder 102.

Also, the cam follower 104 fitted in the first movable lens frame 103 is engaged at the point of intersection between the cam slot 101a of the fixed cylinder 101 and the convex lead cam 102a of the cam cylinder 102. Therefore, the first movable lens frame 103 moves in the direction of the optic axis while rotating with the lens unit L2 in accordance with said point of intersection. Also, the second movable lens frame 107 is fixed integrally to the cam cylinder 102 and therefore, the lens unit L3 moves by an amount equal to the amount of movement of the cam cylinder 102, i.e., the amount of movement of the lens unit L1. In the present embodiment, the magnification changing operation is performed in the manner described above.

A recess 104f is formed in a portion of the outer periphery fitting portion 104e of the cam follower 104 correspondingly to the projected portion 103b provided on a portion of the hole 103a of the first movable lens frame 103 to thereby unrotatably support the cam follower 104. Thus, during assemblage, the convex lead cam 102a of the cam cylinder 102 can be easily inserted into the lead groove 104b formed in the upper surface of the cam follower 104. Also, the angle of inclination of the inclined surface 102b against which the convex lead cam 102a bears during the operation and the angle of inclination $\beta$ of the inclined surface 104c of the cam follower 104 are made equal to each other to thereby stabilize the sliding state.

According to the above-described fourth embodiment, there can be achieved a lens moving device in which the shapes of a curved cam slot structure formed in a fixed cylinder, a convex lead cam provided on the inner peripheral surface of a cam cylinder and a cam follower are appropriately set as previously described, whereby the engaged relationship between the cam cylinder and the cam follower is established well, and the inner peripheral surface side of the cam cylinder is constructed into a shape which can be molded by only a fixed mold and a movable mold to thereby simplify the mold structure and shorten the molding cycle and also, the inclined surface of the outer periphery of the cam follower is designed to fit to the inclined surface of a cam slot formed in the fixed cylinder, thereby improving the shock resistance and wear resistance of the cam follower.

What is claimed is:

1. A lens barrel comprising:
   (a) a lens;
   (b) a lens holding member holding said lens and movably supported; and
   (c) cam means for moving said lens holding member, said cam means having a cam portion projectedly formed on a movable cam member, and a cam follower contacting with said cam portion, said cam follower having a plurality of contact surfaces for sandwiching said cam portion therebetween by surface contact, said plurality of contact surfaces being disposed while being deviated along the direction of extension of said cam portion.

2. A lens barrel according to claim 1, wherein said cam follower is formed integrally with said lens holding member.

3. A lens barrel according to claim 1, wherein said cam portion is of a square cross-sectional shape.

4. A lens barrel according to claim 1, wherein the portion of said cam follower which sandwiches said cam portion is of a groove-like shape, and the surface thereof opposed to said contact surfaces escapes so as to be in non-contact with said cam portion.

5. A lens barrel according to claim 1, wherein said cam portion is formed on the bore side of said cam member.

6. A lens barrel according to claim 2, wherein said cam portion is formed on the bore side of said cam member.

7. A lens barrel according to claim 3, wherein said cam portion is formed on the bore side of said cam member.

8. A lens barrel according to claim 4, wherein said cam portion is formed on the bore side of said cam member.

9. A lens barrel according to claim 4, wherein said contact surfaces of said cam follower are deviated from one another with a line substantially orthogonal to the direction of extension of said cam portion as the boundary.

10. A lens barrel according to claim 4, wherein said lens performs the magnification changing action by being moved in the direction of the optic axis.

11. A lens barrel according to claim 10, wherein said cam member is rotatable about the optic axis to thereby move said cam follower in the direction of the optic axis.

12. A lens barrel according to claim 11, wherein said cam follower is movable only in the direction of the optic axis.

13. A lens barrel comprising:
    (a) a lens;
    (b) a lens holding member holding said lens and movably supported; and
    (c) cam means for moving said lens holding member, said cam means having a movable cam member provided with a projectedly formed cam portion, a fixed member formed with a cam slot and a cam follower located at the point of intersection between said cam portion and said cam slot, said cam follower being formed with a groove portion for embracing said cam portion and a peripheral portion contacting with said cam slot.

14. A lens barrel according to claim 13, wherein said cam follower is moved in the direction of the optic axis by the movement of said cam member in the direction of the optic axis.

15. A lens barrel according to claim 13, wherein said cam member is of a cylindrical shape, and said cam portion extends on a straight line.

16. A lens barrel according to claim 13, wherein said cam slot is formed into a tapered shape, and a tapered surface having a taper angle substantially coincident with the taper angle of said cam slot is also formed on said peripheral portion of said cam follower.

17. A lens barrel according to claim 13, wherein said cam follower is secured to said lens holding member.

18. A lens barrel according to claim 17, wherein said lens performs the magnification changing action by being moved in the direction of the optic axis.

19. A lens barrel according to claim 14, wherein said cam follower is secured to said lens holding member.

20. A lens barrel according to claim 19, wherein said lens performs the magnification changing action by being moved in the direction of the optic axis.

21. A lens barrel according to claim 13, wherein said cam portion is formed on the bore side of said cam member.

22. A lens barrel according to claim 21, wherein said fixed member is disposed on the bore side of said cam member.

23. A lens barrel according to claim 13, wherein said cam member is supported for movement only in the direction of the optic axis.

* * * * *